(12) United States Patent
Ali et al.

(10) Patent No.: US 9,043,107 B2
(45) Date of Patent: May 26, 2015

(54) VEHICLE YAW STABILITY CONTROL METHOD AND APPARATUS

(71) Applicant: VOLVO CAR CORPORATION, Goeteborg (SE)

(72) Inventors: Mohammad Ali, Angered (SE); Mattias Bengtsson, Billdal (SE); Per Landfors, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 13/798,755

(22) Filed: Mar. 13, 2013

(65) Prior Publication Data
US 2013/0289843 A1 Oct. 31, 2013

(30) Foreign Application Priority Data

Apr. 27, 2012 (EP) .................................... 12165836

(51) Int. Cl.
*B60T 8/1755* (2006.01)

(52) U.S. Cl.
CPC ........... *B60T 8/17554* (2013.01); *B60T 8/1755* (2013.01); *B60T 2201/08* (2013.01); *B60T 2210/36* (2013.01); *B60T 2220/02* (2013.01); *B60T 2220/03* (2013.01)

(58) Field of Classification Search
CPC ............ B60T 2260/022; B60T 8/1755; B60G 2202/42; B60G 2204/143; B60G 17/0162
See application file for complete search history.

(56) References Cited

U.S. PATENT DOCUMENTS 6,155,655 A * 12/2000 Matsuno ..................... 303/140
7,164,980 B1 * 1/2007 Doll et al. ..................... 701/48
(Continued)

FOREIGN PATENT DOCUMENTS

DE 10223679 12/2003
EP 1078831 2/2001
(Continued)

OTHER PUBLICATIONS

Extended European Search Report for EP 12165836.3, Completed by the European Patent Office on Sep. 25, 2012, 4 Pages.

*Primary Examiner* — John R Olszewski
*Assistant Examiner* — Nicholas K Wiltey
(74) *Attorney, Agent, or Firm* — Brooks Kushman P.C.

(57) ABSTRACT

A vehicle yaw stability control method and a vehicle yaw stability control apparatus are provided. The yaw rate $\dot{\psi}$ of the vehicle is measured. A first reference yaw rate $\dot{\psi}_{ref}$ is set. A difference yaw rate $\Delta\dot{\psi}$ is set. Stabilizing braking intervention is triggered when a value of the difference yaw rate $\Delta\dot{\psi}$ exceeds limits defined by difference yaw rate threshold values $\Delta\dot{\psi}_{min}$, $\Delta\dot{\psi}_{max}$. Information regarding the shape of the road ahead of the vehicle is acquired. The reliability of the driver steering input $\delta$ is evaluated upon stabilizing braking intervention being triggered. In case the driver steering input $\delta$ is deemed unreliable a replacement reference yaw rate $\dot{\psi}_{ref}^{road}$ is set based on the acquired road shape and a replacement difference yaw rate $\Delta\dot{\psi}^{road}$ is set whereupon stabilizing braking intervention is performed based on the replacement difference yaw rate $\Delta\dot{\psi}^{road}$.

14 Claims, 3 Drawing Sheets

(56) References Cited

U.S. PATENT DOCUMENTS

| | | | |
|---|---|---|---|
| 7,302,328 B2* | 11/2007 | Kato et al. | 701/41 |
| 2004/0158377 A1 | 8/2004 | Matsumoto et al. | |
| 2007/0145819 A1* | 6/2007 | Lin et al. | 303/146 |
| 2007/0188020 A1* | 8/2007 | Schmidt et al. | 303/149 |
| 2010/0145575 A1* | 6/2010 | Switkes et al. | 701/41 |
| 2010/0209885 A1* | 8/2010 | Chin et al. | 434/65 |
| 2011/0130926 A1* | 6/2011 | Lu et al. | 701/42 |
| 2011/0251748 A1* | 10/2011 | Moran et al. | 701/29 |

FOREIGN PATENT DOCUMENTS

| | | |
|---|---|---|
| EP | 2022693 | 2/2009 |
| EP | 2261093 | 12/2010 |
| EP | 2374676 | 10/2011 |

* cited by examiner

US 9,043,107 B2

VEHICLE YAW STABILITY CONTROL METHOD AND APPARATUS

CROSS-REFERENCE TO RELATED APPLICATIONS

This application claims foreign priority benefits under 35 U.S.C. §119(a)-(d) to European patent application number EP 12165836.3, filed Apr. 27, 2012, which is incorporated by reference in its entirety.

TECHNICAL FIELD

Embodiments herein relate to a vehicle yaw stability control method as well as a vehicle yaw stability control apparatus.

BACKGROUND

According to recent studies, in motorized countries about half of all fatal accidents are single vehicle crashes. Studies also show that unintentional roadway departures accounts for the highest share of these traffic related fatalities.

The automotive industry has developed active safety systems that aim to prevent or mitigate accidents. One example is yaw stability control systems that assist the driver in regaining control of the vehicle. Yaw stability control systems have proven to be very efficient in reducing the amount of fatalities in traffic.

Conventional yaw stability control systems rely heavily on the driver's actions when controlling the motion of the vehicle. Based on the steering wheel angle provided by the driver, the yaw stability control system computes a desired trajectory which is tracked when the vehicle operates in an unsafe region of the state space, in order to maintain safe travel.

A measure based on the vehicle's yaw rate is used in conventional yaw stability control systems to identify when the driver has lost control and requires assistance. This measure may be seen as a comparison between the vehicle's actual trajectory and an interpretation of the trajectory that the driver intends to follow. If the difference between the driver's intentions and the vehicle's actual movement becomes too large the system decides to assist the driver in following the intended trajectory.

Interpretation of the driver's intentions is done by feeding the driver's input, i.e. steering angle through a simplified vehicle model with the assumption that it corresponds to the driver's perception of a vehicle's behavior. The simplified vehicle model that is used to compute the intended, or equivalently the reference trajectory in conventional yaw stability control systems is normally a single track vehicle model, according to FIG. 1. In the simplified model the lateral tire force at each tire $F_{yf}$, $F_{yr}$ is approximated to be linearly related to the tyre slip angle, $\alpha$. With this view, one may say that the conventional yaw stability control system aims at making the car follow the driver's intentions. The vehicle slip angle $\beta$ is also illustrated in FIG. 1 and is defined as the angle of the velocity vector v in the vehicle's coordinate system x, y.

By commanding a desired trajectory, a skilled driver may efficiently use the yaw stability control system in challenging situations to keep the vehicle on the road. However, normal or inexperienced drivers of a vehicle equipped with a conventional yaw stability control system, may behave incorrectly in such challenging situations, due to e.g. panic, and fail to guide the yaw stability control system in order to maintain a safe trajectory. In fact, it is common that vehicle motion reaches the limit of adhesion between tire and road due to panic reactions of the driver.

SUMMARY

Embodiments herein aim to provide an improved vehicle yaw stability control method.

This is provided by a vehicle yaw stability control method, comprising the steps of: measuring the yaw rate $\dot{\psi}$ of the vehicle; setting a first reference yaw rate $\dot{\psi}_{ref}$; setting a difference yaw rate $\Delta\dot{\psi}$; triggering stabilizing braking intervention when a value of the difference yaw rate $\Delta\dot{\psi}$ exceeds limits defined by difference yaw rate threshold values $\Delta\dot{\psi}_{min}$, $\Delta\dot{\psi}_{max}$, which further comprises the steps of: acquiring road shape information regarding the shape of the road ahead of the vehicle; evaluating the reliability of the driver steering input $\delta$ upon stabilizing braking intervention being triggered; and in case the driver steering input $\delta$ is deemed unreliable performing the further steps of: setting a replacement reference yaw rate $\dot{\psi}_{ref}^{road}$ based on the acquired road shape; setting a replacement difference yaw rate $\Delta\dot{\psi}^{road}$; performing stabilizing braking intervention based on the replacement difference yaw rate $\Delta\dot{\psi}^{road}$.

The provision of the steps for acquiring road shape information and setting a replacement reference yaw rate $\dot{\psi}_{ref}^{road}$ based on the acquired road shape, setting a replacement difference yaw rate $\Delta\dot{\psi}^{road}$ and performing stabilizing braking intervention based on the replacement difference yaw rate $\Delta\dot{\psi}^{road}$ enables tracking of the road trajectory instead of the reference trajectory provided by the driver steering input $\delta$ in case the driver steering input $\delta$ is not evaluated as reliable. This will provide improved vehicle yaw stability control in case of inappropriate or panic reactions of the driver.

According to a second aspect the replacement reference yaw rate $\dot{\psi}_{ref}^{road}$ is set through computing a product of constant c dependent on the acquired road shape and a longitudinal velocity $v_x$ of the vehicle.

The provision of setting the replacement reference yaw rate $\dot{\psi}_{ref}^{road}$, as described for the second aspect, enables a convenient way of accounting for the road curvature ahead of the vehicle.

According to a third aspect the replacement reference yaw rate $\dot{\psi}_{ref}^{road}$ is set through using a lane keeping controller algorithm to calculate a virtual steering angle $\delta_{virt}$ based at least partially on the acquired road shape and feeding this virtual steering angle $\delta_{virt}$ through a single track vehicle model.

The provision of setting the replacement reference yaw rate $\dot{\psi}_{ref}^{road}$, as described for the third aspect, enables a more refined computation of the replacement reference yaw rate $\dot{\psi}_{ref}^{road}$.

According to a fourth aspect the reliability of the driver steering input $\delta$ is evaluated through forming a difference reference yaw rate $\Delta\dot{\psi}_{ref}$ as a difference between the replacement reference yaw $\dot{\psi}_{ref}^{road}$ and the first reference yaw rate $\dot{\psi}_{ref}$ where the driver steering input $\delta$ is deemed reliable as long as the value of the difference reference yaw rate $\Delta\dot{\psi}_{ref}$ remains within a deadband the limits of which are defined by difference reference yaw rate threshold values $\Delta\dot{\psi}_{ref}^{min}$, $\Delta\dot{\psi}_{ref}^{max}$.

The provision of evaluating the driver steering input $\delta$, as described for the fourth aspect, enables a reliable comparison of the reference trajectory provided by the driver steering input $\delta$ to the trajectory required to stay on the road for evaluating the reliability of the driver steering input $\delta$.

According to a fifth aspect the reliability of the driver steering input δ is evaluated through monitoring the driver using a driver monitoring system for estimating the driver's ability to control the vehicle where the driver steering input δ is deemed reliable as long as the driver is estimated as able to control the vehicle.

A driver monitoring system arranged to monitor the driver, as described for the fifth aspect, provides for an alternative way to evaluate the reliability of the driver steering input δ.

Further embodiments herein aim to provide an improved vehicle yaw stability control apparatus.

According to a sixth aspect a vehicle yaw stability control apparatus, comprises: a yaw rate measuring unit for measuring the yaw rate $\dot{\psi}$ of the vehicle; a first reference yaw rate setting unit for setting a first reference yaw rate $\dot{\psi}_{ref}$; a difference yaw rate setting unit for setting a difference yaw rate $\Delta\dot{\psi}$; a stabilizing braking intervention triggering unit for triggering stabilizing braking intervention when a value of the difference yaw rate $\Delta\dot{\psi}$ exceeds limits defined by difference yaw rate threshold values $\Delta\dot{\psi}_{min}$, $\Delta\dot{\psi}_{max}$, which further comprises: a road shape information acquiring unit for acquiring information regarding the shape of the road ahead of the vehicle; a driver steering input δ reliability evaluating unit for evaluating the reliability of the driver steering input δ upon stabilizing braking intervention being triggered; a replacement reference yaw rate setting unit for setting a replacement reference yaw rate $\dot{\psi}_{ref}^{road}$ based on the acquired road shape in case the driver steering input δ has been deemed unreliable by the driver steering input δ reliability evaluating unit; a replacement difference yaw rate setting unit for setting a replacement difference yaw rate $\Delta\dot{\psi}^{road}$ in case a replacement reference yaw has been set by the replacement reference yaw rate setting unit; and wherein the stabilizing braking intervention triggering unit is arranged to perform stabilizing braking intervention based on the replacement difference yaw rate $\Delta\dot{\psi}^{road}$ in case a replacement difference yaw rate $\Delta\dot{\psi}^{road}$ has been set by the replacement difference yaw rate setting unit.

The provision of the units for acquiring road shape information and setting a replacement reference yaw rate $\dot{\psi}_{ref}^{road}$ ad based on the acquired road shape, setting a replacement difference yaw rate $\Delta\dot{\psi}^{road}$ and performing stabilizing braking intervention based on the replacement difference yaw rate $\Delta\dot{\psi}^{road}$, as described for the sixth aspect, enables tracking of the road trajectory instead of the reference trajectory provided by the driver steering input δ in case the driver steering input δ is not evaluated as reliable. This will provide improved vehicle yaw stability control in case of inappropriate or panic reactions of the driver.

According to a seventh aspect the replacement reference yaw rate setting unit is arranged to set the replacement reference yaw rate $\dot{\psi}_{ref}^{road}$ computing a product of constant c dependent on the acquired road shape and a longitudinal velocity $v_x$ of the vehicle.

The provision of arranging the replacement reference yaw rate setting unit to set the replacement reference yaw rate $\dot{\psi}_{ref}^{road}$, as described for the seventh aspect, enables a convenient way of accounting for the road curvature ahead of the vehicle.

According to an eight aspect the replacement reference yaw rate setting unit is arranged to set the replacement reference yaw rate $\dot{\psi}_{ref}^{road}$ through using a lane keeping controller algorithm to calculate a virtual steering angle $\delta_{virt}$ based at least partially on the acquired road shape and feeding this virtual steering angle $\delta_{virt}$ through a single track vehicle model.

The provision of the replacement reference yaw rate setting unit being arranged to set the replacement reference yaw rate $\dot{\psi}_{ref}^{road}$, as described for the eight aspect, enables a more refined computation of the replacement reference yaw rate $\dot{\psi}_{ref}^{road}$.

According to a ninth aspect the driver steering input δ reliability evaluating unit is arranged to evaluate the reliability of the driver steering input δ through forming a difference reference yaw rate $\Delta\dot{\psi}_{ref}$ as a difference between the replacement reference yaw rate $\dot{\psi}_{ref}^{road}$ and the first reference yaw rate $\dot{\psi}_{ref}$ where the driver steering input δ is deemed reliable as long as the value of the difference reference yaw rate $\Delta\dot{\psi}_{ref}$ remains within a deadband the limits of which are defined by difference reference yaw rate threshold values $\Delta\dot{\psi}_{ref}^{min}$, $\Delta\dot{\psi}_{ref}^{max}$.

The provision of the driver steering input δ reliability evaluating unit being arranged to evaluate the reliability of the driver steering input δ, as described for the ninth aspect, provides for a reliable comparison of the reference trajectory provided by the driver steering input δ to the trajectory required to stay on the road for evaluating the reliability of the driver steering input δ.

According to a tenth aspect the driver steering input δ reliability evaluating unit is arranged to evaluate the reliability of the driver steering input δ through monitoring the driver using a driver monitoring system for estimating the driver's ability to control the vehicle where the driver steering input δ is deemed reliable as long as the driver is estimated as able to control the vehicle.

The provision of the driver steering input δ reliability evaluating unit being arranged to evaluate the reliability of the driver steering input δ, as described for the tenth aspect, provides for an alternative way to evaluate the reliability of the driver steering input δ.

BRIEF DESCRIPTION OF THE DRAWINGS

In the following, embodiments herein will be described in greater detail by way of example only with reference to attached drawings, in which.

Figure 1:
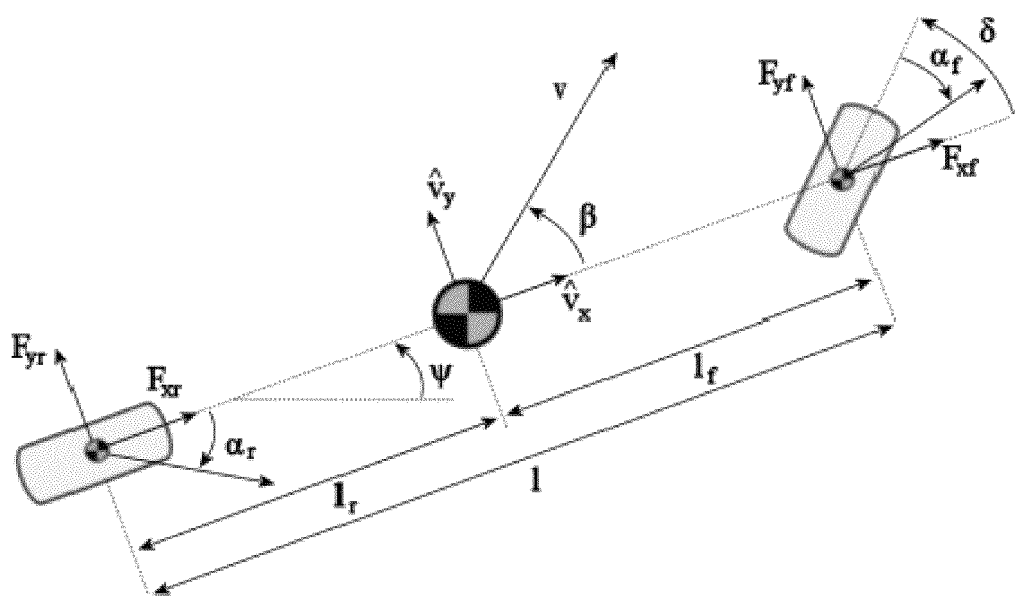
FIG. 1 is a schematic illustration of a single track vehicle model according to embodiments hereof.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments are disclosed herein. However, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art. Throughout the following description similar reference numerals have been used to denote similar elements, parts, items or features, when applicable.

In overview, embodiments herein, utilizes knowledge about the road in order to address some of the limitations of conventional yaw stability control systems, which are not ready to take advantage of the road preview capabilities envisioned to be a more or less standard functionality in future vehicles.

As in conventional yaw stability control systems information about the host vehicle's state is provided through measurements by on-board systems and sensors, e.g. inertial measurement units, providing information on e.g. the host vehicle's speed and yaw rate.

Additionally, embodiments herein rely in the fact that information regarding the road ahead, i.e. the future geometrical path of the road, may be acquired from on-board systems, e.g. sensor systems such as vision systems (cameras), LIDAR (Light Detection And Ranging) systems, RADAR (RAdio Detection And Ranging) systems and/or from digital map systems such as GPS systems (Global Positioning System) or similar.

A measure considered by conventional yaw stability control algorithms is the difference $\Delta\dot{\psi}$ between a first reference yaw rate $\dot{\psi}_{ref}$ and the vehicle's measured yaw rate $\dot{\psi}$, i.e.

$$\Delta\dot{\psi} = \dot{\psi}_{ref} - \dot{\psi} \qquad (1)$$

The first reference yaw rate $\dot{\psi}_{ref}$ is acquired through feeding the steering input $\delta$ through a single track vehicle model. An example of such a single track vehicle model is illustrated in FIG. 1.

A large value for the difference $\Delta\dot{\psi}$ between the first reference yaw rate $\dot{\psi}_{ref}$ and the vehicle's measured yaw rate $\dot{\psi}$ is acquired when the vehicle operates in the nonlinear region of the tire characteristics, where the vehicle dynamics are difficult to handle for normal drivers.

Conventional yaw stability control systems are usually inactive within a deadband formed by the value of the difference $\Delta\dot{\psi}$ between the first reference yaw rate $\dot{\psi}_{ref}$ and the vehicle's measured yaw rate $\dot{\psi}$ within limits defined by difference yaw rate threshold values $\Delta\dot{\psi}_{min}$, $\Delta\dot{\psi}_{max}$, i.e.

$$\Delta\dot{\psi}_{min} \leq \Delta\dot{\psi} \leq \Delta\dot{\psi}_{max}. \qquad (2)$$

Once the vehicle operates outside the deadband, yaw stability control utilizes individual wheel braking and throttle in order to regulate this difference yaw rate $\Delta\dot{\psi}$ to zero. The threshold values for the maximum and minimum difference yaw rates, $\Delta\dot{\psi}_{min}$ and $\Delta\dot{\psi}_{max}$, may be set through tuning.

According to embodiments herein is proposed the replacement of the first reference yaw rate $\dot{\psi}_{ref}$ in the first equation (1) with an alternative tracking reference, i.e. a replacement reference yaw rate $\dot{\psi}_{ref}^{road}$ in case the first reference yaw rate $\dot{\psi}_{ref}$ provided by the steering input $\delta$ of the driver is deemed unsafe/unreliable.

According to a first embodiment, the replacement reference yaw rate $\dot{\psi}_{ref}^{road}$ may be computed as $$\dot{\psi}_{ref}^{road} = cv_x, \qquad (3)$$

where c denotes the road shape, in particular the road curvature, and $v_x$ denotes the longitudinal velocity of the vehicle.

Figure 2:
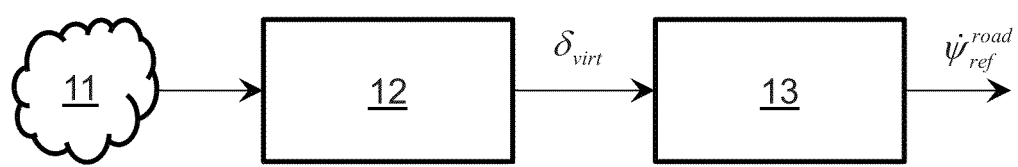
FIG. 2 is a schematic illustration of a second embodiment computation of an alternative tracking reference.

According to a second embodiment, illustrated in the block chart of FIG. 2, a more involved computation of the replacement reference yaw rate $\dot{\psi}_{ref}^{road}$ may be performed. Vehicle parameters 11, such as e.g. lane position and vehicle orientation, are input to a lane keeping controller 12. A lane keeping control algorithm of the lane keeping controller 12 is used to generate a virtual steering angle command $\delta_{virt}$ aiming at keeping the vehicle in the lane. This virtual steering angle command $\delta_{virt}$ is then fed through the single track vehicle model 13 (e.g. such as illustrated in FIG. 1) to generate the replacement reference yaw rate $\dot{\psi}_{ref}^{road}$, in the same way as the driver's steering input $\delta$ is used to generate the reference yaw rate $\dot{\psi}_{ref}$ in equation (1).

In both of the above embodiments, i.e. the first and second embodiments, the first reference yaw rate $\dot{\psi}_{ref}$ in the conventional yaw control scheme is replaced by the replacement reference yaw rate $\dot{\psi}_{ref}^{road}$ in order to control the vehicle motion if the first reference yaw rate $\dot{\psi}_{ref}$ provided by the driver's steering input $\delta$ is deemed unsafe/unreliable.

In a further embodiment, the reliability of the first reference yaw rate $\dot{\psi}_{ref}$ is determined by forming a difference reference yaw rate $\Delta\dot{\psi}_{ref}$ as the difference between the replacement reference yaw rate $\dot{\psi}_{ref}^{road}$ and the first reference yaw rate $\dot{\psi}_{ref}$ as:

$$\Delta\dot{\psi}_{ref} = \dot{\psi}_{ref}^{road} - \dot{\psi}_{ref} \qquad (4)$$

i.e. comparing the reference trajectory provided by the driver steering input $\delta$ to the trajectory required to stay on the road. As long as the value of the difference reference yaw rate $\Delta\dot{\psi}_{ref}$ is within a deadband $$\Delta\dot{\psi}_{ref}^{min} \leq \Delta\dot{\psi}_{ref} \leq \Delta\dot{\psi}_{ref}^{max} \qquad (5)$$

the limits of which are defined by difference reference yaw rate threshold values $\Delta\dot{\psi}_{ref}^{min}$, $\Delta\dot{\psi}_{ref}^{max}$, the yaw stability control algorithm operates in the conventional way, as described above. However if the difference reference yaw rate $\Delta\dot{\psi}_{ref}$ is outside the deadband the first reference yaw rate $\dot{\psi}_{ref}$ provided by the driver's steering input $\delta$ is deemed unreliable and the first reference yaw rate $\dot{\psi}_{ref}$ is replaced by the replacement reference yaw rate $\dot{\psi}_{ref}^{road}$ in control algorithm (1) in order to track the road trajectory instead of the reference trajectory provided by the driver steering input $\delta$.

Thus the control algorithm becomes:

$$\Delta\dot{\psi}^{road} = \dot{\psi}_{ref}^{road} - \dot{\psi} \qquad (6)$$

Where $\Delta\dot{\psi}^{road}$ thus is a replacement difference yaw rate replacing $\Delta\dot{\psi}$ and once the vehicle operates outside the deadband (2), yaw stability control utilizes individual wheel braking and throttle in order to regulate this replacement difference yaw rate $\Delta\dot{\psi}^{road}$ to zero.

In a still further embodiment the process of determining the reliability of the first reference yaw rate $\dot{\psi}_{ref}$ provided by the driver's steering input $\delta$ relies on a driver monitoring system, which is arranged to estimate the driver's ability to control the vehicle.

In accordance with the present application is also envisaged an automotive vehicle 10 comprising a vehicle yaw stability control apparatus 1 based on the above described principles.

Figure 3:
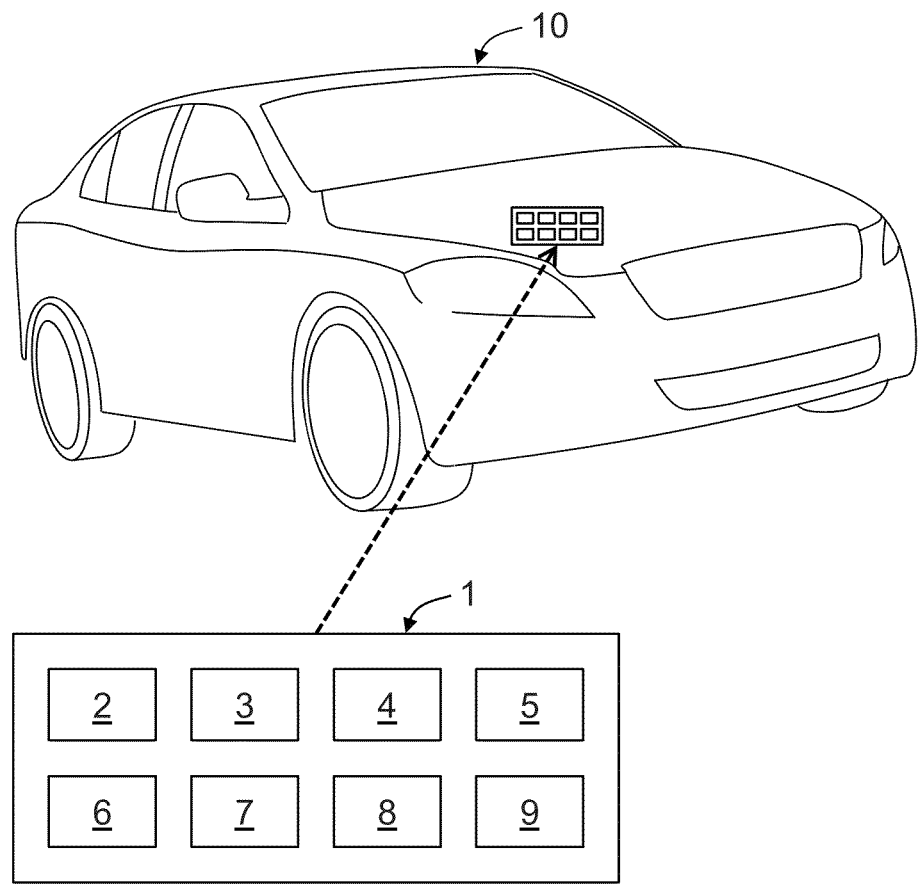
FIG. 3 is a schematic illustration of an automotive vehicle comprising a vehicle yaw stability control apparatus according to embodiments hereof.

The vehicle yaw stability control apparatus 1, as illustrated in FIG. 3, comprises: a yaw rate measuring unit 2 for measuring the yaw rate $\dot{\psi}$ of the vehicle; a first reference yaw rate setting unit 3 for setting a first reference yaw rate $\dot{\psi}_{ref}$; a difference yaw rate setting unit 4 for setting a difference yaw rate $\Delta\dot{\psi}$; a stabilizing braking intervention triggering unit 5 for triggering stabilizing braking intervention when a value of the difference yaw rate $\Delta\dot{\psi}$ exceeds limits defined by difference yaw rate threshold values $\Delta\dot{\psi}_{min}$, $\Delta\dot{\psi}_{max}$.

The stabilizing braking intervention triggering unit 5 may be arranged to trigger stabilizing braking intervention by a conventional braking system of the vehicle, not illustrated in FIG. 3.

The vehicle yaw stability control apparatus 1, further comprises: a road shape information acquiring unit 6 for acquiring information regarding the shape of the road ahead of the vehicle; a driver steering input $\delta$ reliability evaluating unit 7 for evaluating the reliability of the driver steering input $\delta$ upon stabilizing braking intervention being triggered; a replacement reference yaw rate setting unit 8 for setting a replacement reference yaw rate $\dot{\psi}_{ref}^{road}$ based on the acquired road shape in case the driver steering input $\delta$ has been deemed unreliable by the driver steering input $\delta$ reliability evaluating unit 7; a replacement difference yaw rate setting unit 9 for setting a replacement difference yaw rate $\Delta\dot{\psi}^{road}$ in case a replacement reference yaw rate has been set by the replacement reference yaw rate setting unit 8.

In the vehicle yaw stability control apparatus 1 the stabilizing braking intervention triggering unit 5 is arranged to perform stabilizing braking intervention based on the replacement difference yaw rate $\Delta\dot{\psi}^{road}$ in case a replacement difference yaw rate $\Delta\dot{\psi}^{road}$ has been set by the replacement difference yaw rate setting unit 9.

In further embodiments of the vehicle yaw stability control apparatus 1 the replacement reference yaw rate setting unit 8 is arranged to set the replacement reference yaw rate $\dot{\psi}_{ref}^{road}$ through computing a product of constant c dependent on the acquired road shape and a longitudinal velocity $v_x$ of the vehicle.

In still further embodiments of the vehicle yaw stability control apparatus 1 the replacement reference yaw rate setting unit 8 is arranged to set the replacement reference yaw rate $\dot{\psi}_{ref}^{road}$ through using a lane keeping controller algorithm to calculate a virtual steering angle $\delta_{virt}$ based at least partially on the acquired road shape and feeding this virtual steering angle $\delta_{virt}$ through a single track vehicle model.

In further embodiments of the vehicle yaw stability control apparatus 1 the driver steering input $\delta$ reliability evaluating unit 7 is arranged to evaluate the reliability of the driver steering input $\delta$ through forming a difference reference yaw rate $\Delta\dot{\psi}_{ref}$ as a difference between the replacement reference yaw rate $\dot{\psi}_{ref}^{road}$ and the first reference yaw rate $\dot{\psi}_{ref}$ where the driver steering input $\delta$ is deemed reliable as long as the value of the difference reference yaw rate $\Delta\dot{\psi}_{ref}$ remains within a deadband the limits of which are defined by difference reference yaw rate threshold values $\Delta\dot{\psi}_{ref}^{min}$, $\Delta\dot{\psi}_{ref}^{max}$.

In yet further embodiments of the vehicle yaw stability control apparatus 1 the driver steering input $\delta$ reliability evaluating unit 7 is arranged to evaluate the reliability of the driver steering input $\delta$ through monitoring the driver using a driver monitoring system for estimating the driver's ability to control the vehicle where the driver steering input $\delta$ is deemed reliable as long as the driver is estimated as able to control the vehicle.

The units of the yaw stability control apparatus 1 may, although illustrated as one integral entity, be distributed throughout the vehicle and also fully or partially integrated into other vehicle systems. As examples the road shape information acquiring unit 6 may e.g. comprise one or more cameras for viewing the road ahead through a windshield of the vehicle 10, one or more RADAR or LIDAR detectors placed in a forward looking position such as in the vehicle grille or similar. Further, the stabilizing braking intervention triggering unit 5 may be distributed to a braking system of the vehicle 10.

The vehicle yaw stability control method implemented in the vehicle yaw stability control apparatus 1 described above comprises the steps of: measuring the yaw rate $\dot{\psi}$ of the vehicle; setting a first reference yaw rate $\dot{\psi}_{ref}$; setting a difference yaw rate $\Delta\dot{\psi}$; and triggering stabilizing braking intervention when a value of the difference yaw rate $\Delta\dot{\psi}$ exceeds limits defined by difference yaw rate threshold values $\Delta\dot{\psi}_{min}$, $\Delta\dot{\psi}_{max}$.

The vehicle yaw stability control method further comprises the steps of: acquiring road shape information regarding the shape of the road ahead of the vehicle; evaluating the reliability of the driver steering input $\delta$ upon stabilizing braking intervention being triggered; and in case the driver steering input $\delta$ is deemed unreliable performing the further steps of: setting a replacement reference yaw rate $\dot{\psi}_{ref}^{road}$ based on the acquired road shape; setting a replacement difference yaw rate $\Delta\dot{\psi}^{road}$; and performing stabilizing braking intervention based on the replacement difference yaw rate $\Delta\dot{\psi}^{road}$.

According to further embodiments the vehicle yaw stability control method further comprises that the replacement reference yaw rate $\dot{\psi}_{ref}^{road}$ is set through computing a product of constant c dependent on the acquired road shape and a longitudinal velocity $v_x$ of the vehicle.

According to still further embodiments the vehicle yaw stability control method further comprises that the replacement reference yaw rate $\dot{\psi}_{ref}^{road}$ is set through using a lane keeping controller algorithm to calculate a virtual steering angle $\delta_{virt}$ based at least partially on the acquired road shape and feeding this virtual steering angle $\delta_{virt}$ through a single track vehicle model.

According to yet further embodiments the vehicle yaw stability control method further comprises that the reliability of the driver steering input $\delta$ is evaluated through forming a difference reference yaw rate $\Delta\dot{\psi}_{ref}$ as a difference between the replacement reference yaw rate $\dot{\psi}_{ref}^{road}$ and the first reference yaw rate $\dot{\psi}_{ref}$ where the driver steering input $\delta$ is deemed reliable as long as the value of the difference reference yaw rate $\Delta\dot{\psi}_{ref}$ remains within a deadband the limits of which are defined by difference reference yaw rate threshold values $\Delta\dot{\psi}_{ref}^{min}$, $\Delta\dot{\psi}_{ref}^{max}$.

According to some embodiments the vehicle yaw stability control method further comprises that the reliability of the driver steering input $\delta$ is evaluated through monitoring the driver using a driver monitoring system for estimating the driver's ability to control the vehicle where the driver steering input $\delta$ is deemed reliable as long as the driver is estimated as able to control the vehicle.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle yaw stability control method comprising:
    measuring a yaw rate $\dot{\psi}$ of the vehicle;
    setting a first reference yaw rate $\dot{\psi}_{ref}$;
    setting a difference yaw rate: $\Delta\dot{\psi}$, the difference yaw rate comprising the difference between the first reference yaw rate and the measured yaw rate;
    triggering stabilizing braking intervention when a value of the difference yaw rate: $\Delta\dot{\psi}$ exceeds limits defined by difference yaw rate threshold values $\Delta\dot{\psi}_{min}$, $\Delta\dot{\psi}_{max}$
    acquiring road shape information regarding shape of the road ahead of the vehicle;
    when stabilizing braking intervention is triggered, evaluating reliability of a driver steering input $\delta$; and
    when the driver steering input $\delta$ is evaluated as unreliable setting a replacement reference yaw rate $\dot{\psi}_{ref}^{road}$ based on the acquired road shape information,
    setting a replacement difference yaw rate $\Delta\dot{\psi}^{road}$, and
    performing further stabilizing braking intervention based on the replacement difference yaw rate $\Delta\dot{\psi}^{road}$;
    wherein the reliability of the driver steering input $\delta$ is evaluated through forming a difference reference yaw rate $\Delta\dot{\psi}_{ref}$ as a difference between the replacement reference yaw rate $\dot{\psi}_{ref}^{road}$ and the first reference yaw rate $\dot{\psi}_{ref}$ where the driver steering input $\delta$ is deemed reliable as long as the value of the difference reference yaw rate $\Delta\dot{\psi}_{ref}$ remains within a deadband the limits of which are defined by difference reference yaw rate threshold values $\Delta\dot{\psi}_{ref}^{min}$, $\Delta\dot{\psi}_{ref}^{max}$.

2. A vehicle yaw stability control method according to claim 1, wherein the replacement reference yaw rate $\dot{\psi}_{ref}^{road}$ is set through computing a product of constant c dependent on the acquired road shape and a longitudinal velocity $v_x$ of the vehicle.

3. A vehicle yaw stability control method according to claim 1, wherein the replacement reference yaw rate $\dot{\psi}_{ref}^{road}$ is set through using a lane keeping controller algorithm to calculate a virtual steering angle $\delta_{virt}$ based at least partially on the acquired road shape and feeding this virtual steering angle $\delta_{virt}$ through a single track vehicle model.

4. A vehicle yaw stability control method according to claim 1, wherein the reliability of the driver steering input $\delta$ is evaluated through monitoring the driver using a driver monitoring system for estimating the driver's ability to control the vehicle where the driver steering input $\delta$ is deemed reliable as long as the driver is estimated as able to control the vehicle.

5. A vehicle yaw stability control method according to claim 2, wherein the reliability of the driver steering input $\delta$ is evaluated through monitoring the driver using a driver monitoring system for estimating the driver's ability to control the vehicle where the driver steering input $\delta$ is deemed reliable as long as the driver is estimated as able to control the vehicle.

6. A vehicle yaw stability control method according to claim 3, wherein the reliability of the driver steering input $\delta$ is evaluated through monitoring the driver using a driver monitoring system for estimating the driver's ability to control the vehicle where the driver steering input $\delta$ is deemed reliable as long as the driver is estimated as able to control the vehicle.

7. A vehicle yaw stability control apparatus comprising:
    a yaw rate measuring unit configured to measure a yaw rate $\dot{\psi}$ of the vehicle;
    a first reference yaw rate setting unit configured to set a first reference yaw rate $\dot{\psi}_{ref}$;
    a difference yaw rate setting unit configured to set a difference yaw rate: $\Delta\dot{\psi}$, the difference yaw rate comprising the difference between the first reference yaw rate and the measured yaw rate;
    a stabilizing braking intervention triggering unit configured to trigger stabilizing braking intervention when a value of the difference yaw rate: $\Delta\dot{\psi}$ exceeds limits defined by difference yaw rate threshold values $\Delta\dot{\psi}_{min}$, $\Delta\dot{\psi}_{max}$;
    a road shape information acquiring unit configured to acquire information regarding a shape of the road ahead of the vehicle;
    a driver steering input $\delta$ reliability evaluating unit configured to evaluate reliability of a driver steering input $\delta$ when stabilizing braking intervention is triggered by the stabilizing braking intervention triggering unit;
    a replacement reference yaw rate setting unit configured to set a replacement reference yaw rate $\dot{\psi}_{ref}^{road}$ based on the acquired road shape information when the driver steering input $\delta$ has been evaluated as unreliable by the driver steering input $\delta$ reliability evaluating unit; and
    a replacement difference yaw rate setting unit configured to set a replacement difference yaw rate $\Delta\dot{\psi}^{road}$ when a replacement reference yaw rate has been set by the replacement reference yaw rate setting unit;
    wherein the stabilizing braking intervention triggering unit is configured to perform further stabilizing braking intervention based on the replacement difference yaw rate $\Delta\dot{\psi}^{road}$ when a replacement difference yaw rate $\Delta\dot{\psi}^{road}$ has been set by the replacement difference yaw rate setting unit;
    wherein the driver steering input $\delta$ reliability evaluating unit is arranged to evaluate the reliability of the driver steering input $\delta$ through forming a difference reference yaw rate $\Delta\dot{\psi}_{ref}$ as a difference between the replacement reference yaw rate $\dot{\psi}_{ref}^{road}$ and the first reference yaw rate $\dot{\psi}_{ref}$ where the driver steering input $\delta$ is deemed reliable as long as the value of the difference reference yaw rate $\Delta\dot{\psi}_{ref}$ remains within the deadband limits of which are defined by difference reference yaw rate threshold values $\Delta\dot{\psi}_{ref}^{min}$, $\Delta\dot{\psi}_{ref}^{max}$.

8. A vehicle yaw stability control apparatus according to claim 7, wherein the replacement reference yaw rate setting unit is arranged to set the replacement reference yaw rate $\dot{\psi}_{ref}^{road}$ through computing a product of constant c dependent on the acquired road shape and a longitudinal velocity $v_x$ of the vehicle.

9. A vehicle yaw stability control apparatus according to claim 7, wherein the replacement reference yaw rate setting unit is arranged to set the replacement reference yaw rate $\dot{\psi}_{ref}^{road}$ through using a lane keeping controller algorithm to calculate a virtual steering angle $\delta_{virt}$ based at least partially on the acquired road shape and feeding this virtual steering angle $\delta_{virt}$ through a single track vehicle model.

10. A vehicle yaw stability control apparatus according to claim 7, wherein the driver steering input $\delta$ reliability evaluating unit is arranged to evaluate the reliability of the driver steering input $\delta$ through monitoring the driver using a driver monitoring system for estimating the driver's ability to control the vehicle where the driver steering input $\delta$ is deemed reliable as long as the driver is estimated as able to control the vehicle.

11. A vehicle yaw stability control apparatus according to claim 8, wherein the driver steering input $\delta$ reliability evaluating unit is arranged to evaluate the reliability of the driver steering input $\delta$ through monitoring the driver using a driver monitoring system for estimating the driver's ability to control the vehicle where the driver steering input $\delta$ is deemed reliable as long as the driver is estimated as able to control the vehicle.

12. A vehicle yaw stability control apparatus according to claim 9, wherein the driver steering input $\delta$ reliability evaluating unit is arranged to evaluate the reliability of the driver steering input $\delta$ through monitoring the driver using a driver monitoring system for estimating the driver's ability to control the vehicle where the driver steering input $\delta$ is deemed reliable as long as the driver is estimated as able to control the vehicle.

13. An automotive vehicle comprising:
a yaw rate measuring unit configured to measure a yaw rate $\delta$ of the vehicle;
a first reference yaw rate setting unit configured to set a first reference yaw rate $\dot{\psi}_{ref}$;
a difference yaw rate setting unit configured to set a difference yaw rate: $\Delta\dot{\psi}$, the difference yaw rate comprising the difference between the first reference yaw rate and the measured yaw rate;
a stabilizing braking intervention triggering unit configured to trigger stabilizing braking intervention when a value of the difference yaw rate: $\Delta\dot{\psi}$ exceeds limits defined by difference yaw rate threshold values $\Delta\dot{\psi}_{min}$, $\Delta\dot{\psi}_{max}$;
a road shape information acquiring unit configured to acquire information regarding a shape of the road ahead of the vehicle;
a driver steering input $\delta$ reliability evaluating unit configured to evaluate reliability of a driver steering input $\delta$ when stabilizing braking intervention is triggered by the stabilizing braking intervention triggering unit;
a replacement reference yaw rate setting unit configured to set a replacement reference yaw rate $\dot{\psi}_{ref}^{road}$ based on the acquired road shape information when the driver steering input $\delta$ has been evaluated as unreliable by the driver steering input $\delta$ reliability evaluating unit; and
a replacement difference yaw rate setting unit configured to set a replacement difference yaw rate $\Delta\dot{\psi}^{road}$ when a replacement reference yaw rate has been set by the replacement reference yaw rate setting unit;
wherein the stabilizing braking intervention triggering unit is configured to perform further stabilizing braking intervention based on the replacement difference yaw rate $\Delta\dot{\psi}^{road}$ when a replacement difference yaw rate $\Delta\dot{\psi}^{road}$ has been set by the replacement difference yaw rate setting unit;
wherein the driver steering input $\delta$ reliability evaluating unit is arranged to evaluate the reliability of the driver steering input $\delta$ through forming a difference reference yaw rate $\Delta\dot{\psi}_{ref}$ as a difference between the replacement reference yaw rate $\dot{\psi}_{ref}^{road}$ and the first reference yaw rate $\dot{\psi}_{ref}$ where the driver steering input $\delta$ is deemed reliable as long as the value of the difference reference yaw rate $\Delta\dot{\psi}_{ref}$ remains within the deadband limits of which are defined by difference reference yaw rate threshold values $\Delta\dot{\psi}_{ref}^{min}$, $\Delta\dot{\psi}_{ref}^{max}$.

14. A vehicle yaw stability control apparatus according to claim 7, wherein the replacement reference yaw rate setting unit is arranged to set the replacement reference yaw rate $\dot{\psi}_{ref}^{road}$ through computing a product of constant c dependent on the acquired road shape and a longitudinal velocity $v_x$ of the vehicle.

* * * * *

UNITED STATES PATENT AND TRADEMARK OFFICE
CERTIFICATE OF CORRECTION

PATENT NO. : 9,043,107 B2
APPLICATION NO. : 13/798755
DATED : May 26, 2015
INVENTOR(S) : Mohammad Yusuf Ali et al.

It is certified that error appears in the above-identified patent and that said Letters Patent is hereby corrected as shown below:

In the claims

Column 11, Lines 27-28, Claim 13:

After "configured to measure a yaw rate"
Delete "$\delta$" and
Insert -- $\dot{\psi}$ --.

Column 11, Lines 31-32, Claim 13:

After "a difference yaw rate: " $\Delta\dot{\psi}$ "
Insert -- wherein the --.

Signed and Sealed this
Thirteenth Day of October, 2015

Michelle K. Lee
*Director of the United States Patent and Trademark Office*